May 11, 1943.  F. W. KRAMER  2,319,002
MOTOR VEHICLE BODY
Filed Dec. 22, 1941  2 Sheets-Sheet 1

Inventor
F. W. Kramer,
By Christian R. Nielsen
Attorney

May 11, 1943.　　　F. W. KRAMER　　　2,319,002
MOTOR VEHICLE BODY
Filed Dec. 22, 1941　　　2 Sheets-Sheet 2
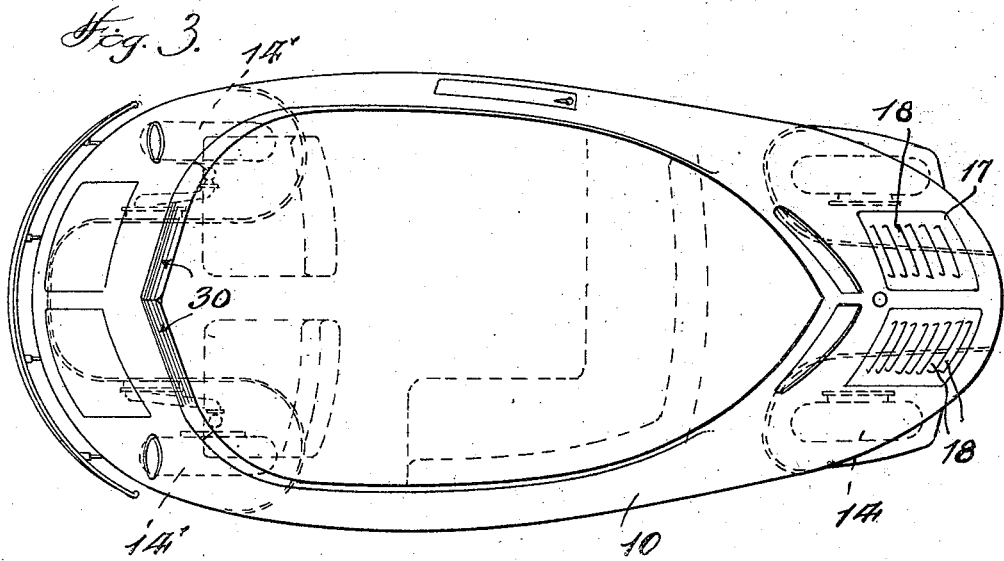
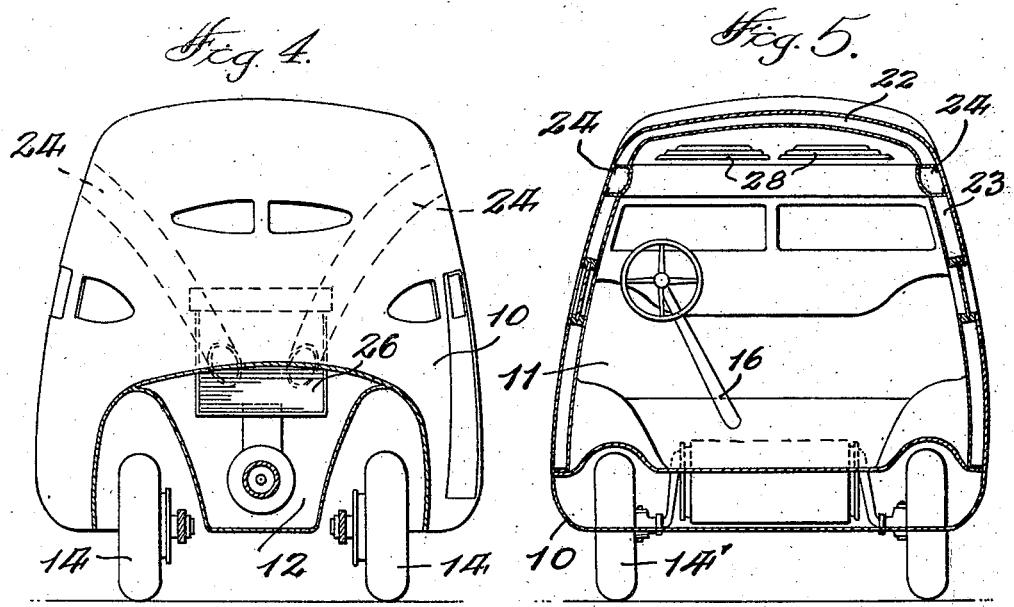
INVENTOR.
F. W. Kramer,
BY Christian L. Nielsen
ATTORNEY.

Patented May 11, 1943

2,319,002

UNITED STATES PATENT OFFICE 2,319,002

MOTOR VEHICLE BODY

Fred W. Kramer, New Orleans, La.

Application December 22, 1941, Serial No. 424,038

4 Claims. (Cl. 180—54)

This invention relates to motor vehicle bodies and more particularly to means for ventilating and/or heating in passenger compartment as well as the engine compartment, and is a continuation in part of application Serial No. 285,793, filed July 21, 1939, now Patent 2,266,769. The invention consists in the constructions, arrangements and combinations herein described and claimed.

It is also an object of the invention to construct the body in full streamline effect, reducing friction, and enabling its use as a land or water craft, since air and water resistance is greatly reduced.

It is a still further object of the invention to provide a body in which a forced draft air tempering and circulating system may be readily built in as a unitary part of the body operable in conjunction with incoming fresh air, and to provide means whereby when desired, the circulation of air may be diverted to the passenger compartment, or to the engine compartment, to cool the engine of the vehicle, or the air may be divided between the two compartments.

It is also an object of the invention to provide a construction of body in which an air conditioning unit may be incorporated permitting discharge of either a cooled or heated air into the body, as required.

Additional objects, advantages and features of invention will be apparent from the following description considered in conjunction with the accompanying drawings, wherein Figure 1 is a side elevation of a vehicle constructed in accordance with the invention.

Figure 3 is a top plan view of the vehicle.

Figure 4 is a vertical cross section on the line 4—4 of Figure 2.

Figure 5 is a similar view on the line 5—5 of Figure 2.

Figure 1:
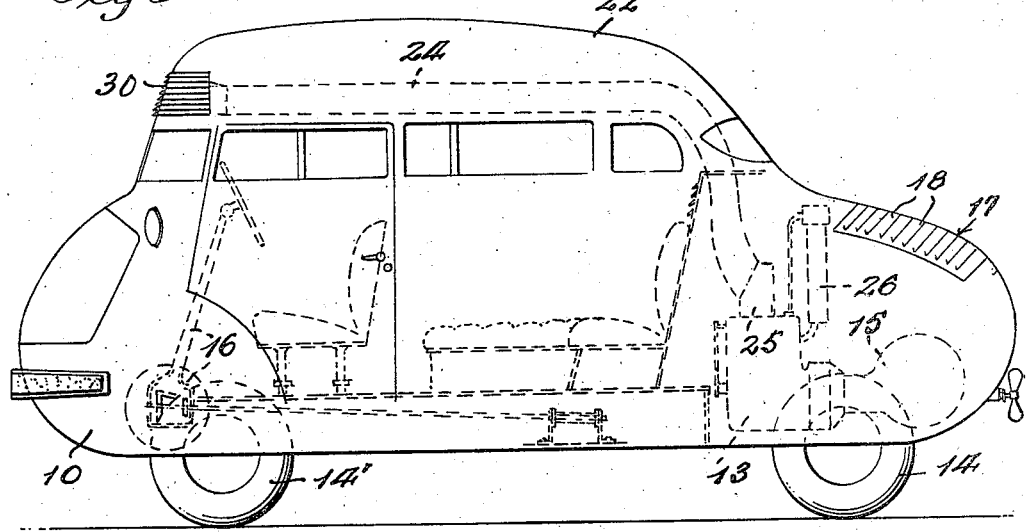
Figure 2:
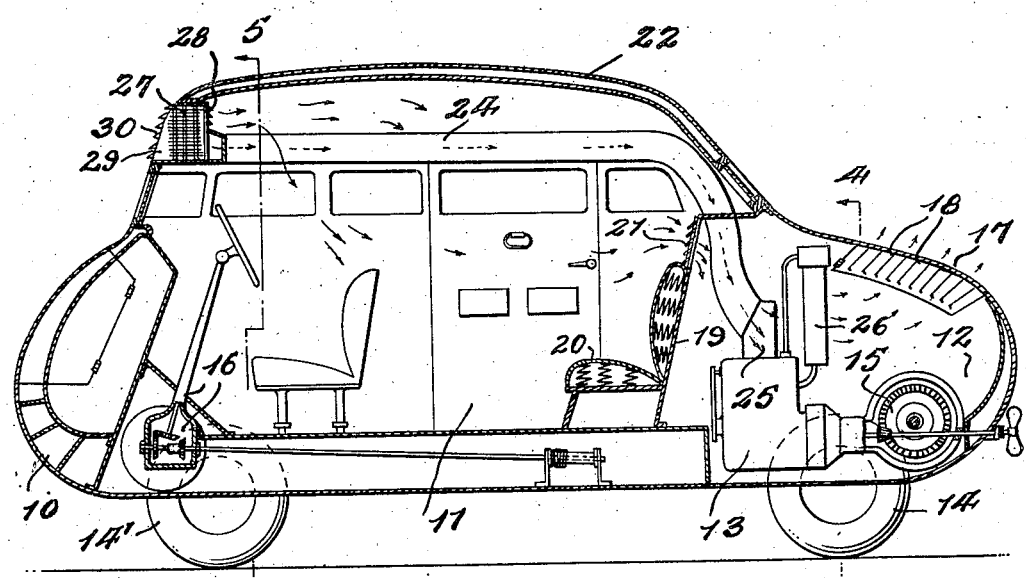
Figure 2 is a longitudinal sectional view of the vehicle.

There is illustrated a vehicle 10 embodying a passenger compartment 11 and a rearwardly positioned motor compartment 12 housing an engine 13, operatively connected with traction drive wheels 14 through gearing 15. The vehicle also includes front steering wheels 14' as well as suitable steering gear indicated at 16. This structure as well as the general body construction has been fully described in my application previously referred to and since the claims of the present application are not directed to the structure, a detailed discussion thereof is not believed essential.

The compartment 12 includes a suitably hinged closure door 17 provided with louvers 18 for a purpose as will presently appear. The compartment has a forward wall 19 which in the present instance forms the back rest of the rear seat 20 of the vehicle. This wall is provided with adjustable shutters 21 in an upper portion thereof, whereby air from the compartment may pass to the motor compartment when the shutters are in open position.

The upper or roof portion 22 of the vehicle, as well as the side walls 23 are shown as a double shell construction, and at the juncture between the side walls and the roof portion, a duct 24 is formed in each side wall, the ducts leading rearwardly to and opening upon a suction means 25 mounted upon and operatively connected with the engine 13 so as to draw air through the ducts.

The discharge of air from the suction means 25 is such as to direct the air over the engine and through the radiator 26 and may finally pass through the louvers 18 of the compartment door 17 to the atmosphere.

In the fore upper part of the roof 22 an air tempering unit 27 is built in, the lower portion of which is in communication with the fore ends of the ducts 24, while the upper portion of the unit is provided with adjustable shutters 28 for controlling discharge of tempered air within the passenger compartment 11.

The roof 22 at its front part is preferably constructed with a compartment 29 for accommodation of the unit 27, the front or open end thereof being provided with adjustable shutters 30.

The air tempering unit 27 has not been disclosed in detail since any conventional unit may be employed so long as it will function to discharge either a cooled or heated air into the passenger compartment 11 and the ducts 24.

Figure 6:
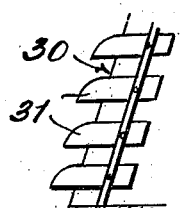
Figure 6 is a detail of shutter control.

In Figure 6, there is shown conventionally a type of shutter which may be employed for controlling the passage of air into the tempering unit 27 which consists of pivotally mounted shutter elements 31 operable by means of a rod 32.

In use, air passes through the shutters 31 and the tempering unit 27 which we will say is set to discharge a cooled air. Some of the cooled air will be discharged through the shutters 28 so as to discharge into the passenger compartment 11 and be circulated therearound and finally discharges through the shutters 21 into the motor compartment 12 where it will circulate around the engine 13 and radiator 26 to effect a cooling thereof. Air will also pass through the lower portion of the unit 27 and pass through respective ducts 24, being drawn therethrough by the suction means 25, although when the vehicle is in motion the forward movement of the vehicle will tend to force the air therethrough. Such air is discharged into the motor compartment so as to discharge through the radiator 26, circulate about the motor and finally discharge through the louvers 18 of the door 17. Heated air may be similarly controlled.

It will be understood of course, that the amount of air discharged into the passenger and motor compartments may be regulated by adjustment of the various shutters 21, 28 and 30. For instance, the shutters 28 may be adjusted so as to limit excessive passage of air into the compartment 11, and also the shutters 21 may be partially closed so that there will be a reduced circulation of air, thus avoiding drafts which may be uncomfortable to passengers.

While I have shown and specifically described a preferred embodiment of the invention, this is by way of illustration only, and I consider as my own all such modifications in construction as fairly fall within the scope of the appended claims.

I claim:

1. In a motor vehicle or the like, a body having an opening at the front thereof, and having ducts on the sides thereof open to said opening of the body, a compartment in the rear of the body, a power unit in the compartment for propelling the vehicle, suction means operatively connected with the power unit, said ducts being in communication with the suction means, shutter means between the open front and the interior of the body, and a door for the compartment, said door having louvers for escape of air drawn into the compartment.

2. The structure of claim 1 in which the power unit comprises a radiator positioned in the path of out-flowing air.

3. In a motor vehicle or the like, a body having a passenger compartment and a motor compartment to the rear thereof, said motor compartment having a louvered closure door; the body having an opening at the forward part thereof, an air tempering unit fixed in the said opening and in communication with the passenger compartment, means for controlling passage of air into the passenger compartment and ducts on the sides of the body in communication with the air tempering unit and opening upon said motor compartment.

4. The structure of claim 3 in which adjustable shutters are provided for controlling air entering the air tempering unit, and in which the passenger compartment includes adjustable shutters for controlling passage of air to said motor compartment.

FRED W. KRAMER.